(12) United States Patent
Pfeiffer-Wagner

(10) Patent No.: US 10,566,750 B2
(45) Date of Patent: Feb. 18, 2020

(54) CONTACT DEVICE

(71) Applicant: PSZ ELECTRONIC GMBH, Vohenstrauss (DE)

(72) Inventor: Klaus Pfeiffer-Wagner, Weiden (DE)

(73) Assignee: PSZ ELECTRONIC GMBH, Vohenstrauss (DE)

( * ) Notice: Subject to any disclaimer, the term of this patent is extended or adjusted under 35 U.S.C. 154(b) by 0 days.

(21) Appl. No.: 16/185,938

(22) Filed: Nov. 9, 2018

(65) Prior Publication Data

US 2019/0123497 A1 Apr. 25, 2019

Related U.S. Application Data

(63) Continuation of application No. 15/891,952, filed on Feb. 8, 2018, now Pat. No. 10,256,584, which is a continuation of application No. 15/397,293, filed on Jan. 3, 2017, now Pat. No. 9,929,522.

(51) Int. Cl.
*H01R 25/14* (2006.01)
*H01R 4/48* (2006.01)
*H01R 41/00* (2006.01)
*H02B 1/20* (2006.01)

(52) U.S. Cl.
CPC ............. *H01R 25/142* (2013.01); *H01R 4/48* (2013.01); *H01R 41/00* (2013.01); *H02B 1/20* (2013.01)

(58) Field of Classification Search
CPC .... H01R 25/14; H01R 25/142; H01R 25/145; H01R 25/16; H01R 25/161; H01R 25/162; H01R 25/164; H01R 25/165; H01R 25/167; H01R 25/168
See application file for complete search history.

(56) References Cited

U.S. PATENT DOCUMENTS 7,997,910 B2 * 8/2011 Myers .................. H01R 25/142 439/121

* cited by examiner

*Primary Examiner* — Ross N Gushi
(74) *Attorney, Agent, or Firm* — Flener IP & Business Law; Zareefa B. Flener; Ayhan E. Mertogul

(57) ABSTRACT

A contact device for transmitting electrical energy from a preferably spatially fixed busbar to a tap-off bar, movable along the busbar, including: at least one connecting housing, the busbar being mechanically connected to the tap-off bar by connecting housing, at least one combi clip, the combi clip brought into engagement with part of the outer periphery of the connecting housing in a mechanically releasable manner and establishing a mechanical connection between the connecting housing and a connecting bracket.

15 Claims, 6 Drawing Sheets

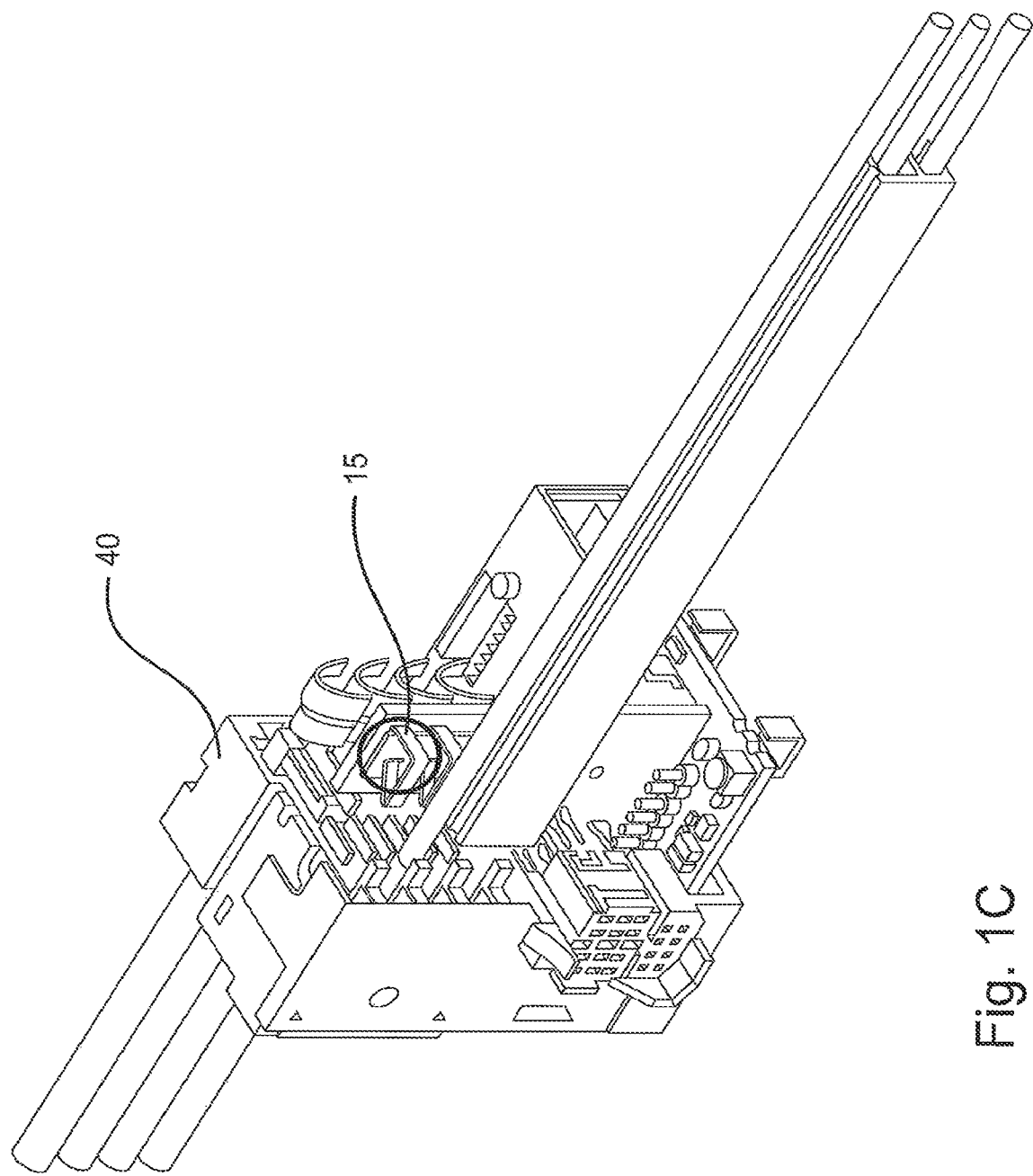

CONTACT DEVICE

This is a continuation of U.S. application Ser. No. 15/891,952, filed Feb. 8, 2018, pending, the disclosure of which is hereby incorporated by reference herein in its entirety.

The present application relates to a contact device for transmitting electrical energy from a preferably spatially fixed busbar to a tap-off bar which is movable along the busbar or likewise spatially fixed, according to the preamble of claim 1.

In particular, the busbar can be an arrangement of a plurality of elongate electrical conductors laid in parallel with one another, which, for example, are mounted individually or together in additional insulation elements, for example plastics bodies. Moreover, the busbar can be rigidly mounted in a manufacturing facility, for example on its floor, without the busbar moving relative to the floor during operation.

For example, the individual electrical conductors can be guided in the form of a bar, preferably also along a bar or in the form of a barguide.

In order to then supply a production robot continually, i.e. in an uninterrupted manner, with electrical energy, for example, it is therefore often necessary to install a tap-off bar between the above-mentioned busbar and an electrically operated production robot or another electrically operable element of this type.

For example, the tap-off bar is movable in the main direction of extension of the busbar, preferably together with such a robot, but is in constant electrical contact with the busbar during the movement.

Alternatively, both bars can also be spatially fixed.

In other words, the tap-off bar therefore allows a reliable supply of electrical energy to the robot or the other electrical element, irrespective of the point at which the robot is located relative to the busbar, provided that the tap-off bar is in reliable electrical contact with the busbar.

In the process, however, a device is required which brings the busbar and the tap-off bar into contact with one another so as to be electrically conductive. The contact device according to the invention proposed in accordance with the above disclosure of the invention serves this purpose.

To this end, the above contact device has at least one connecting housing, the busbar being mechanically connected to the tap-off bar by the connecting housing. Preferably, the busbar is also electrically conductively connected to the tap-off bar by the connecting housing.

Moreover, the contact device described here comprises a combi clip, the combi clip being brought into engagement with part of the outer periphery of the connecting housing in a mechanically releasable manner in order to produce a mechanical connection between the connecting housing and a connecting bracket.

Therefore, preferably all remaining components of the contact device are mounted movably or immovably on the connecting housing. For example, the entire contact device including the connecting bracket moves together with the robot in the main direction of extension of the busbar during the movement of such a robot.

Preferably, the combi clip is formed with an electrically insulating material, for example a plastics material. In this connection, it is feasible for the material of the combi clip to be a multi-component plastics material, which for example is produced by means of an "injection moulding" process. Alternatively, the combi clip can also be made of a ceramic completely or in part. Although ceramic is relatively expensive to procure, ceramics do exhibit a high level of thermal insulation.

Alternatively or additionally, parts of or the entire combi clip can also be produced in a 3D printing process. This has incidentally proven to be advantageous since in the field of contact devices for transmitting electrical energy, a whole range of individual requirements are placed on the combi clip, for example in respect of its size, thickness and dimensions. That is to say, the combi clip preferably also defines a distance between the connecting housing and the busbar in at least one direction.

Moreover, it is feasible for the combi clip to be formed at least partially or entirely, in addition to the electrically insulating material referred to above, with metal or inorganic parts in the micrometre or nanometre range. That is to say, it has transpired that, inter alia, such nanoparticles also ensure a higher strength of the combi clip. That is to say, the combi clip is preferably the only mechanical connection between the connecting housing and the connecting bracket.

As shown below in a non-limiting manner, the following 3D print technologies are possible:

1. The FDM Method (Fused Deposition Modelling)

Alternative Names: Fused Filament Fabrication (FFF), Fused Layer Modelling (FLM)

The method describes layered outputting (extrusion) of a material through a hot nozzle. The consumable material is in the form of a long wire (so-called filament) on a roll and is pushed by the conveyor unit into a print head, melted therein and outputted onto a print bed. In the process, the print head and/or print bed are movable in three directions. Layers of plastics can thus be outputted in stages on top of one another.

2. The SLS Method (Selective Laser Sintering)

Unlike the sintering method, in which materials in powder form are combined with one another under the effect of heat, this occurs selectively in the SLS method using a laser (alternatively also an electron beam or infrared beam). Therefore, only a certain quantity of the powder is molten together.

For this purpose, a thin layer of powder is constantly outputted by the layering unit onto the print bed. The laser (or other energy source) is now precisely aligned with individual points on the powder layer in order to form the first layer of printed data. In the process, the powder is melted or fused and then solidifies again as a result of slight cooling. The powder that has not been fused remains lying around the sintered regions and serves as a support material. After one layer has solidified, the print bed is lowered by a fraction of a millimetre. The layering unit now travels across the print bed and outputs the next layer of powder.

Subsequently, the second layer of print data is sintered by the laser (or another energy source). A three-dimensional object thus emerges gradually.

3. Three-dimensional Printing (3DP)

The 3DP method functions very similarly to selective laser sintering, but instead of a directed energy source, a print head travels over the powder. This releases tiny droplets of binding agent onto the underlying powder layers, which are thus connected to one another. Apart from this, this method is the same as the SLS method.

4. Stereolithography (SLA)

Instead of a plastics wire or print material in powder form, liquid resins, so-called photopolymers, are used in the stereolithography method. They are hardened in layers by UV radiation and thus produce three-dimensional objects. For this purpose, the platform is lowered gradually in the resin vat. There are also variants (so-called polyjet methods)

without an entire vat with liquid resin. For this purpose, an epoxy resin is applied out of a nozzle droplet by droplet and immediately hardened by a UV laser.

5. Laminated Object Manufacturing (LOM)

Alternative Name: Layer Laminated Manufacturing (LLM)

The method is based on neither chemical reactions nor a thermal process. In the process, a film or plate (for example, paper) is cut along the contour with a cutting tool (for example, a knife or carbon dioxide laser) and bonded in layers on top of one another. A layered object of bonded films laid on top of one another is thus produced by lowering the platform.

Moreover, the contact device described here comprises at least one power plug housing, the power plug housing being positioned mechanically from the outside on the busbar and/or on the tap-off bar such that a mechanical connection between the connecting housing and the busbar and/or the connecting bar is established by the power plug housing. For example, in addition to the mechanical connection, an electrical connection can likewise be established between the connecting housing and the busbar and/or the connecting bar by the power plug housing.

It is feasible for the power plug housing to be designed as an element on the end of the conductor which mechanically connects the tap-off bar and its electrical conductors at one of its ends to the connecting housing securely, but preferably releasably. For this purpose, the power plug housing can be mechanically fixed releasably or non-releasably to a mounting surface of the connecting housing. After fixing, an end of the busbar is therefore mechanically connected via the connecting housing to the busbar and, for example, also electrically conductively connected. The mounting surface is therefore preferably part of the outer surface of the connecting housing. For example, a main extension plane of the mounting surface extends in parallel with the main extension direction and/or main extension plane of the busbar.

Therefore, the above-described contact device essentially has two "connecting devices", one connecting device acting as the above-described combi clip for connecting the connecting bracket to the connecting housing and the other connecting device acting as the above-described "power plug" housing for connecting the tap-off bar to the connecting housing.

According to the invention, the above-described contact device comprises such a combi clip, which establishes the mechanical connection between the connecting housing and the connecting bracket by clipping (=snapping open and snapping shut) onto the part of the outer external periphery of the connecting housing, the combi clip and the connecting bracket being releasably or non-releasably mechanically connected.

In other words, a core element of the present invention, inter alia, is that the combi clip described here, i.e. the connecting element between the connecting housing and the connecting bracket described here, is produced at least substantially by means of a snapping process of the combi clip in regions of the connecting housing and/or of the connecting bracket provided for this purpose instead of by means of screw devices and/or external retaining and gripping devices.

In this respect, the combi clip described here allows, for the first time, a particularly customised, interchangeable and quick connection between the connecting housing and a connecting bracket to be established. Complex adjustment operations and likewise complex fixing operations to fix the connecting bracket to the connecting housing or vice versa are omitted in the process. This therefore allows not only a particularly simple assembly process, but also a quite considerable cost saving and a large amount of variety in the mass production of the individual elements and their fields of application.

According to at least one embodiment, the contact device for transmitting electrical energy from a preferably spatially fixed busbar to a tap-off bar that is movable along the busbar comprises at least one connecting housing, the busbar being mechanically connected to the tap-off bar by means of the connecting housing.

Moreover, the contact device described here comprises at least one combi clip, the combi clip being brought into engagement in a mechanically releasable manner with a part of the outer periphery of the connecting housing and establishing a mechanical connection between the connecting housing and a connecting bracket.

Furthermore, the contact device described here comprises at least one power plug housing, the power plug housing being positioned mechanically and from the outside on the busbar and/or onto the tap-off bar such that a mechanical connection between the connecting housing and the busbar and/or the connecting bar is established by the power plug housing.

According to the invention, the combi clip in the contact device described here is designed such that by clipping the combi clip onto the part of the outer periphery of the connecting housing, the mechanical connection between the connecting housing and the connecting bracket is established, the combi clip being mechanically connected releasably or non-releasably to the connecting bracket. Likewise, in the same manner as the combi clip can be clipped to the outer periphery of the connecting housing, it can likewise also be clipped into or onto the regions provided in the connecting bracket.

According to at least one embodiment, the mechanical connection between the connecting housing and the connecting bracket is only established by clipping the combi clip onto the part of the outer periphery of the connecting housing. Preferably, the connection between the combi clip and the connecting bracket is also only established by clipping on the combi clip.

At least one of the connections (between the combi clip and the connecting housing on the one hand and between the combi clip and the connecting bracket on the other hand) is therefore free of any fastening elements that are separate from the combi clip such as screws, adhesive bolts or tension elements.

In other words, therefore, in such an embodiment, the combi clip itself constitutes its own retaining and fixing means.

According to at least one embodiment, the combi clip has at least one upper side clip element on an upper side for clipping onto the connecting housing, the upper side clip element being designed such that upon application of compressive force towards the connection housing it is automatically positioned against the outer periphery of the connecting housing and/or a free end of the upper side clip element connects to a fastening region of the connecting housing, which is provided for said end and is explicitly assigned to said end.

For example, the upper side clip element projects, in at least one directional component, away from a horizontal mounting plane of the combi clip. The mounting plane of the combi clip can be formed partially or entirely by one material plate, which is for example flat. The mounting plane of the clip element is, for example, parallel to the mounting plane of the connecting housing on which the power plug housing is arranged.

For example, the upper side clip element is constructed on a boundary of the mounting surface of the combi clip. For this purpose, it is conceivable that the upper side clip element is also entirely flush at the edge with the mounting surface of the combi clip. That is to say, this ensures that the upper side clip element therefore attaches itself and, for example, snaps into place, from the outside onto the outer surface, preferably without the aid of additional tools solely as a result of the application of pressure (pressure of the connecting housing towards the combi clip).

In addition to such an upper side clip element arranged on the edge, the combi clip described here can, however, also comprise at least one, but also a plurality of additional upper side clip elements along its mounting surface, which are arranged on and project away from the mounting surface so as to be remote from the edge of the mounting surface.

According to at least one embodiment, the combi clip has at least one underside clip element for fastening in an opening in the connecting bracket on an underside opposite the upper side, the underside clip element being designed such that it brings itself into engagement with a boundary of the opening in the connecting bracket upon application of compressive force onto the combi clip towards the connecting bracket.

The connecting bracket therefore has at least one opening, into which at least one upper side clip element of the combi clip can snap into place on the inside. In the process, this clipping and therefore snap-in movement of the underside clip element can be configured in the same manner as the above-described upper side clip element, simply with the distinction that the upper side clip element and the underside clip element each project in different directions away from the mounting surface of the combi clip and are arranged on different sides of the mounting surface.

According to at least one embodiment, the underside clip element hooks into the opening in the connecting bracket.

In this respect, it is conceivable that the underside clip element is for example designed in the form of a hook, exactly like the upper side clip element. This means that such a hook has an interlocking element at least at the end. That is to say, it has transpired that such interlocking allows particularly simple and automatic interlocking without tools.

According to at least one embodiment, the power plug housing is at least partially open on one side, the power plug housing having at least one power plug clip element on this side and the power plug clip element being designed such that, upon application of compressive force towards the connecting housing, it is automatically positioned against the outer periphery of the connecting element and/or a free end of the power plug clip element is connected to an additional fastening region of the connecting housing, which is provided for said end and is explicitly assigned to said end, at least part of the preferably spatially fixed busbar being arranged between the connecting housing and an internal wall of the power plug housing.

In such an embodiment, it is therefore feasible for the power plug housing, for example instead of being arranged on a mounting surface of the connecting housing, to engage in fastening points of the connecting housing by means of at least one power plug clip element arranged at the edge, and thus a mechanically fixed, for example electrically conductive, connection is established between the busbar and the tap-off bar.

According to at least one embodiment, the connecting housing comprises at least one electrically conductive sliding contact element, this sliding contact element being connected on one side to an electrical board of the connecting housing and being electrically conductively connected on the other side to the busbar via a slide contact.

Here, "electrically conductive board" describes a main board body made of preferably electrically non-conductive material applied to the corresponding conducting tracks by means of an application process (etching or soldering process, etc.). An electrically conductive connection between the busbar and the tap-off bar can therefore be established using these conducting tracks.

Preferably, a main extension plane of the electrically conductive board extends perpendicularly to a main extension direction and/or main extension plane of the busbar and/or of the tap-off bar.

According to at least one embodiment, the sliding contact element comprises an elongate base element, which is set up and provided to establish sliding and electrically conductive sliding contact along and with the busbar upon application of pressure onto the busbar, at least one fastening element of the sliding contact element establishing an electrically conductive connection between the electrically conductive board of the connecting housing and the busbar.

In particular, the sliding contact element can be designed in the form of a flexible spring. For this purpose, the sliding contact element can also have two or more curvatures by means of which an electrically conductive contact of the above kind is established.

According to at least one embodiment, the base element has at least one mounting portion for electrically conductive mounting on the board, the mounting portion constituting the fastening element or the fastening element being releasably or non-releasably fastened thereto. Moreover, the base element comprises a contact portion, the contact portion being connected to the mounting portion so as to be electrically conductive over at least one curved portion, the curved portion extending, preferably extending away, at an angle of less than 90° relative to the mounting portion.

It is, however, also possible for the base element to comprise or have two or more curved portions or two or more mounting portions and/or two or more contact portions.

By means of the curved portion referred to here and its preferably acute angle relative to the mounting portion, it is therefore made possible for the base element to be installed under pressure, i.e. under spring compression, and mounted on the connecting housing and on the board such that mechanical and preferably electrical, permanent contact is established between the sliding contact element and the busbar and/or the tap-off bar.

According to at least one embodiment, the sliding contact element is formed integrally. This can mean that the sliding contact element is formed continuously in one single element, for example from an electrically conductive metal. The sliding contact element can therefore be free of connecting grooves and/or connecting screws. In particular, the sliding contact element can be formed in a single production process from a single piece of metal.

Further advantages and embodiments will emerge from the accompanying drawings, in which:

FIG. 1A-1C are each schematic perspective views of an embodiment of the contact device described here in accordance with the invention;

Figure 1A:
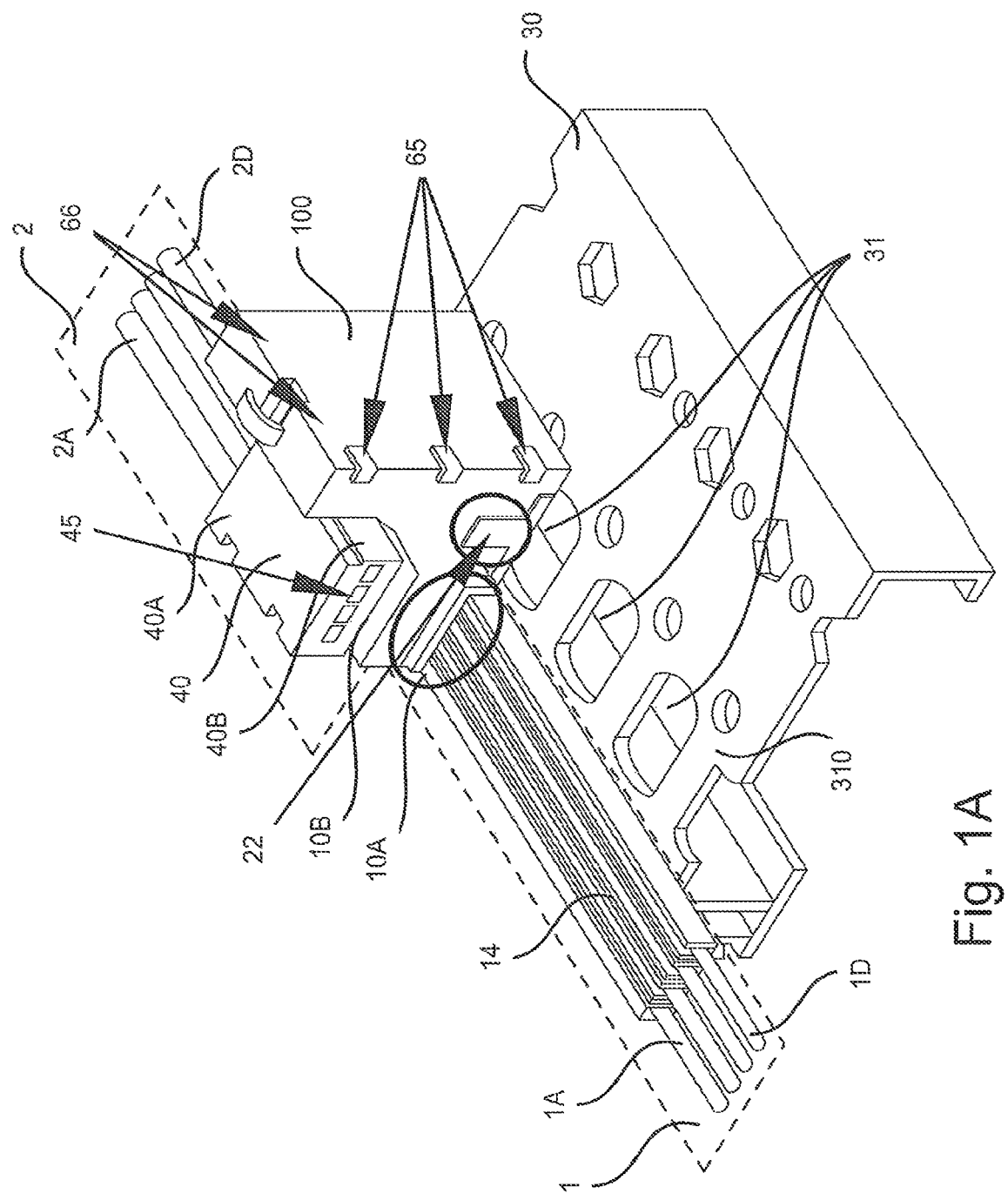

FIG. 1A is a first schematic perspective view of a contact device 100 described here and according to the invention for transmitting electrical energy from a busbar 1, which is spatially fixed in this embodiment, comprising electrical conductors 1A to 1D. Here, the electrical conductors 1A to 1D are each mounted separately and electrically insulated from one another in a plastics frame 14 provided for this purpose, which is at least partially open towards a connecting housing 10 of the contact device 100 in order for electrical contact to be made here.

In this respect, the electrical conductors 1A-1D extend in a longitudinal direction L and each also run separately and parallel to one another in this longitudinal direction L.

The connecting housing 10 connects the busbar 1 mechanically and preferably also electrically conductively to a tap-off bar 2. On the tapping side, the tap-off bar 2 in turn contains the electrical tapping lines 2A-2D that are assigned, preferably explicitly assigned, to the electrical conductors 1A to 1D of the busbar 1, respectively.

The connecting housing 10 is connected by means of a combi clip 20 to a connecting bracket 30 of the contact device 100. For this purpose, the combi clip 20 is clipped on one side into an opening 31 in the connecting bracket 30. On the opposite side, the combi clip 20 is clipped into the connecting housing 10. The combi clip 20 therefore establishes a particularly simple, time-saving and cost-effective snap-in connection (also referred to as a clip connection) between the connecting housing 10 and the connecting bracket 30.

In this respect, in this embodiment, the connecting housing 10 is movable together with the connecting bracket 30, preferably even the whole contact device 100, along the busbar 1 (by means of the combi clip 20). In order to make this possible, the connecting housing 10 also has a through-opening 10A in a longitudinal direction L, through which the busbar 1 is guided. Because the busbar 1 is constructed in a direction towards the connecting housing 10 such that the electrical conductors 1A-1D arranged therein are exposed, an electrical sliding contact can therefore be located on the electrical conductors 1A-1D in these exposed channels.

Moreover, the embodiment according to FIG. 1A comprises a power plug housing 40, which is arranged on a mounting surface 10B of the connecting housing 10. Between the power plug housing 40 and the connecting housing 10, a mechanical, for example also electrically conductive, connection is therefore made possible between the electrical tapping lines 2A-2D guided inside the power plug housing 40 and the electrical lines 1A-1D.

As can be seen from FIG. 1A, the power plug housing 40 shown therein consists of two half-shells 40A and 40B. With regard to assembly, therefore, quite simply the half-shell 40B can first be provided, in a second step the ends of the electrical tapping lines 2A-2D can be laid into the half-shell 40B, and therefore preferably likewise by means of a snap-in process, preferably only by means of a snap-in process, the second half-shell 40A can be snapped onto the first half-shell 40B such that the electrical tapping lines 2A to 2D are arranged and fixed between the two half-shells 40A, 40B. In this respect, therefore, in one embodiment, the power plug housing 40 shown in FIG. 1A also likewise again uses the core concept of a snap-in process described throughout the entire application.

Moreover, the embodiment of the power plug housing 40 according to FIG. 1A has an end plate 45, which is for example flush with the electrical conductors 2A to 2D at the end.

Alternatively, the half-shell element 40A can be joined to the half-shell element 40B in another manner, for example by screws or bonding.

As can likewise already be seen from FIG. 1A, the combi clip 20 has at least one upper side clip element 22 on an upper side 21 for clipping onto the connecting housing 10, which element defines the entire combi clip 20 so as to be flush on the side in a lateral direction L and lines up therewith, and is snapped onto part of the outer surface of the connecting housing 10 from the outside.

The connecting housing also has at least one light signal surface 65. The light signal surface comprises, for example, optical fibre elements, for example organic or inorganic LEDs. The light signal surfaces 65 can be perceived without aids at any time by the user. If the light signal surface 65 lights up, there is electrical contact between the busbar 1 and the tap-off bar 2. Preferably, the light signal surfaces 65 are installed so as to be integrated into a screw dome 66 of the connecting housing.

Figure 1B:
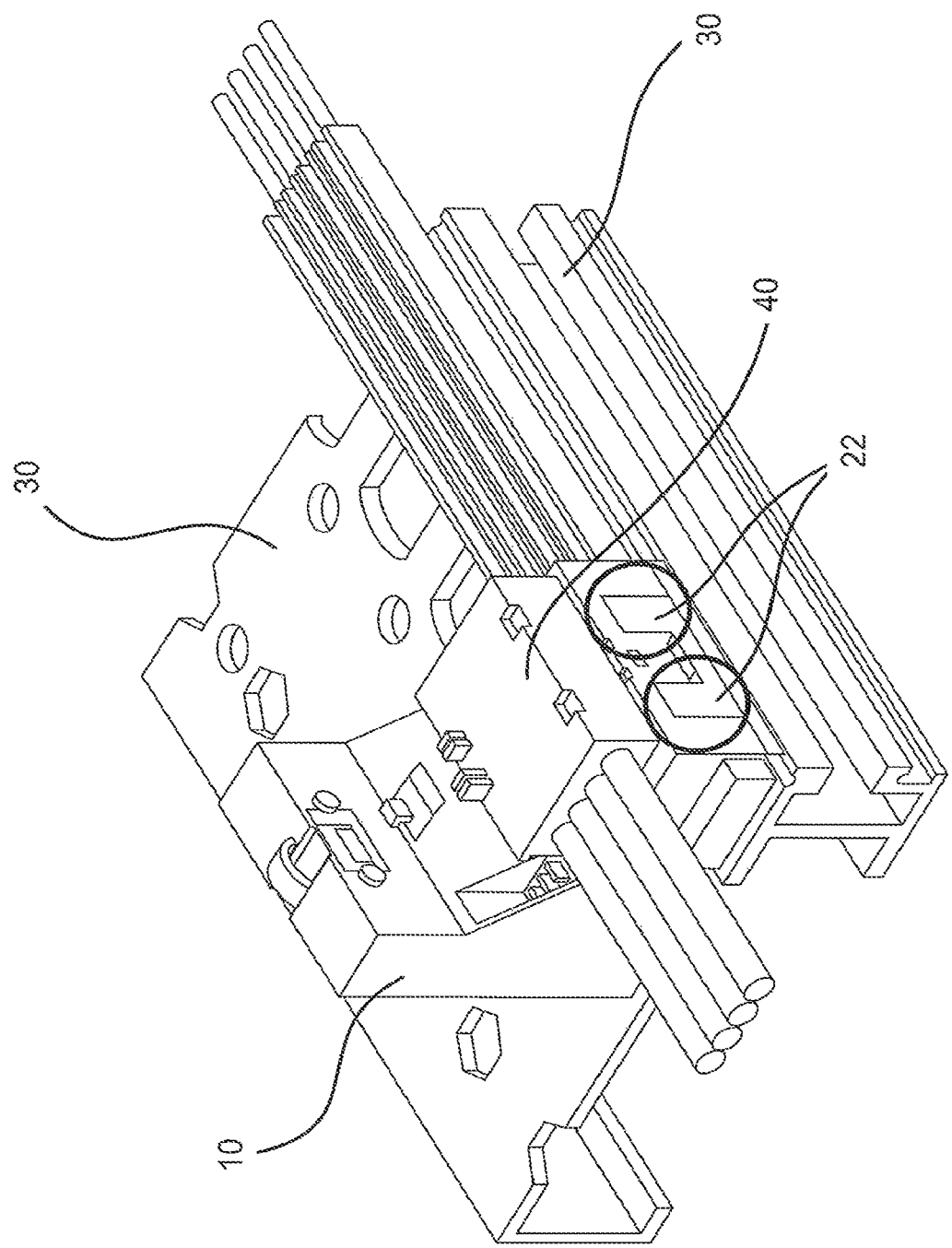

FIGS. 1B and 1C are two further schematic perspective views of the contact device shown in FIG. 1A.

Figure 2A:
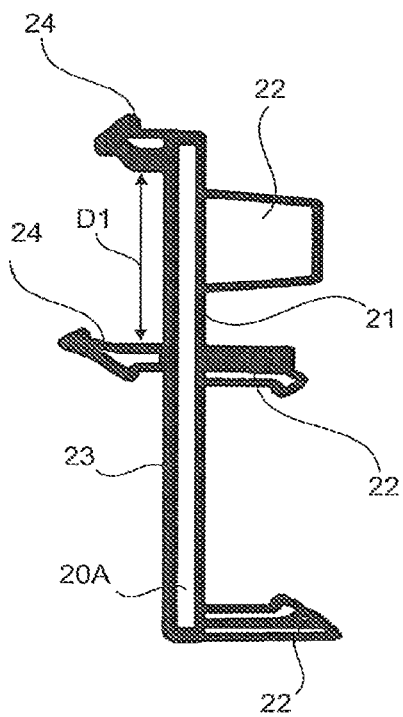
FIG. 2A, 2B show an embodiment of a combi clip described here.

FIG. 2A is a schematic side view of an embodiment of a combi clip 20 described here.

The combi clip 20 has a mounting surface 20A. The mounting surface 20A can therefore also be described as a bearing surface. Moreover, the combi clip 20 has an upper side 21 and an underside 23. On the underside 23, in the embodiment shown in FIG. 2A, two underside clip elements 24 are formed in a direction CL. The underside clip elements 24 project from the mounting surface 2A in a direction extending in a direction perpendicular to the main direction of extension of the mounting surface 20A away from the mounting surface 2A. In the direction CL, the two underside clip elements 24 are arranged at a distance D1 from one another. The distance D1 has a width such that the underside clip elements 24 interlock solely as a result of compressive force and then automatically and in particular without tools onto or with the boundary 310 of the opening 31 in the connecting bracket 30.

However, in the opposite direction, for example, in the same manner as the underside clip elements 24 on the underside previously described above, the upper side clip elements 22 project away from the mounting surface 20A. In the process, the combi clip 20 from FIG. 2A has at least two clip elements, but for example also more clip elements, which are flush with the edge of the mounting surface 20A. For example, at least one additional upper side clip element 22 is however formed in the main extension plane of the mounting region 20A away from the boundary of the mounting surface 20A.

Figure 2B:
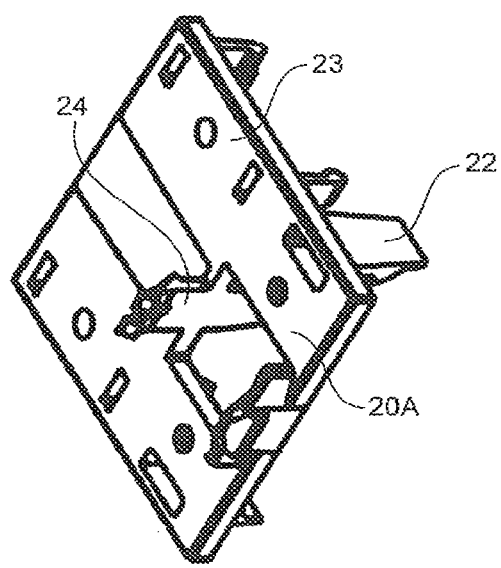

FIG. 2B is a schematic perspective view of the combi clip 20 shown in FIG. 2A.

Figure 3A:
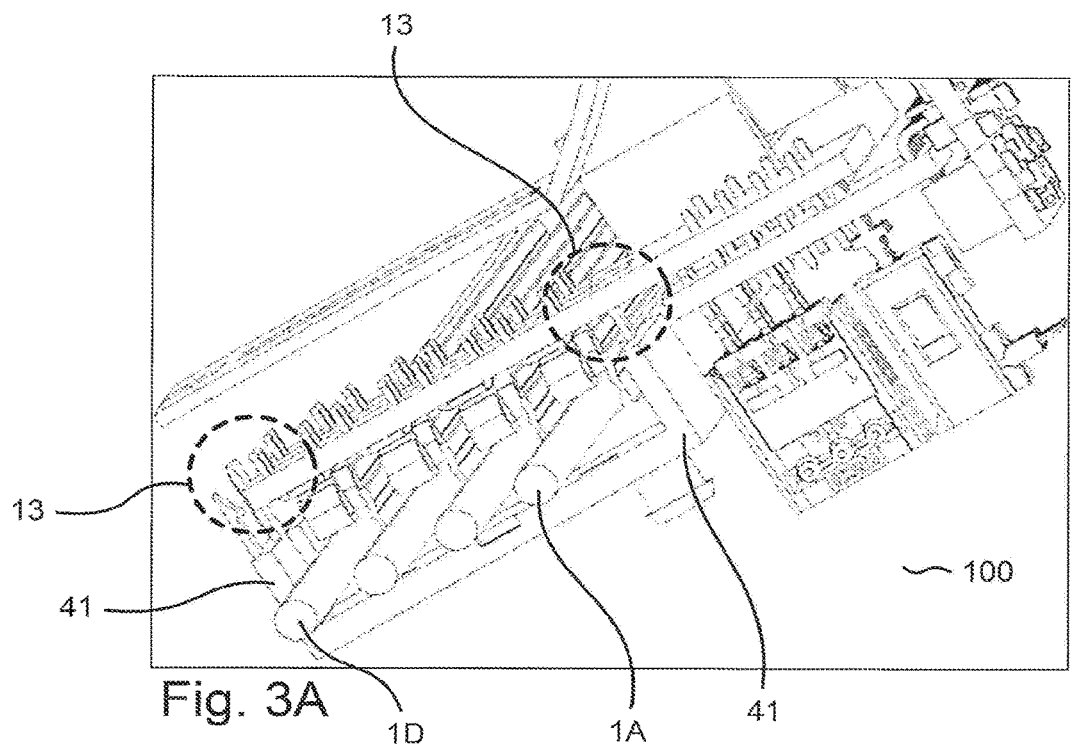
FIG. 3A, 3B show a further embodiment of a contact device described here and in particular an embodiment of a power plug housing described here.

FIG. 3A is a schematic perspective view of a further embodiment of the contact device 100 described here.

As can be seen from FIG. 3A, therefore, instead of mounting the power plug housing 40 on a mounting surface of the connecting housing 10 (as shown in FIG. 1A-1C), the power plug housing 40 is open on one side and has power plug clip elements 41 provided for this purpose on the edge, which elements connect to and interlock with the connecting housing 10 preferably automatically and without tools upon application of compressive force towards an electrically conductive board 16 of the connecting housing 10.

In this respect, the connecting housing 10 has additional fastening regions 13. These additional fastening regions 13 cannot be a constituent part of the connecting housing 10, but rather are already constituted by the electrically conductive board 16 of the connecting housing 10 itself.

After attaching a power plug housing 40 constructed in this manner, the electrical conductors 1A-1D, but alternatively or additionally (and this is not shown) also the electrical conductors 2A-2D, are therefore arranged between an internal wall of the power plug housing 40 and the electrically conductive board 16 of the connecting housing 10.

Figure 3B:
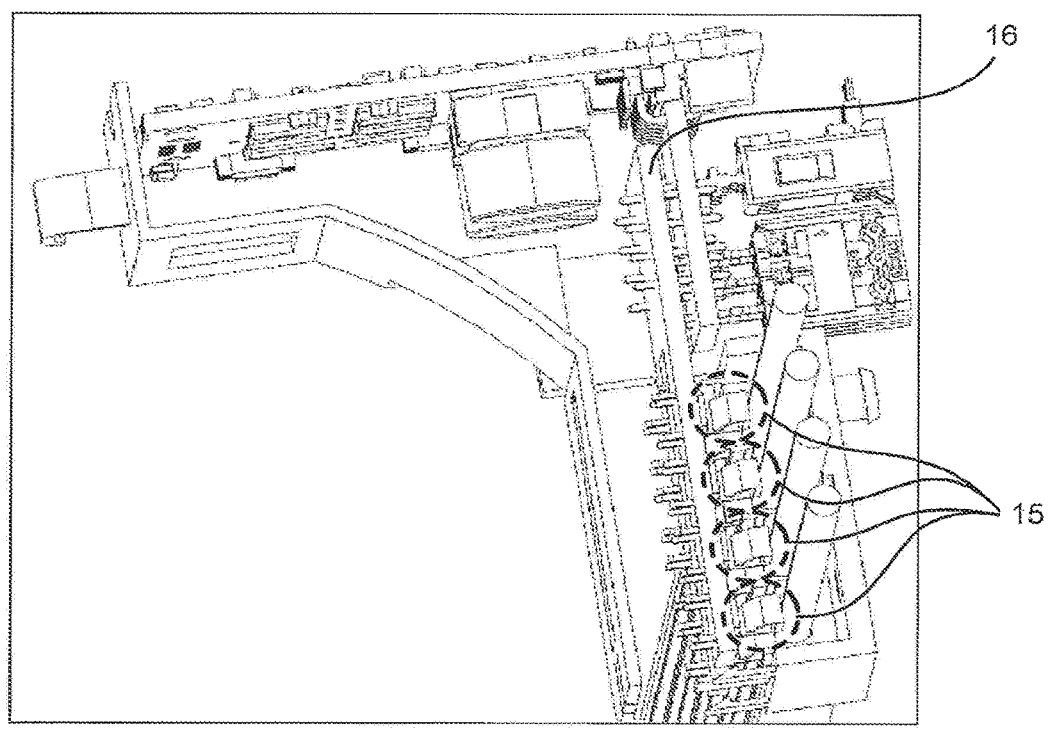

FIG. 3B is a further schematic perspective view of the contact device 100 shown in FIG. 3A.

Figure 4:
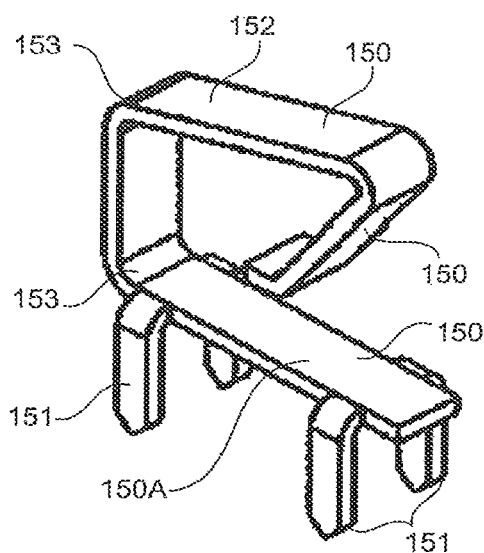
FIG. 4 show an embodiment of the sliding contact element described here.

In FIG. 4, a sliding contact element 15 is shown, as is already shown in FIG. 3B for example, but can also be seen particularly clearly in FIG. 1C.

The sliding contact element 15 shown in FIG. 4 therefore has an elongate base element 150, which is set up and provided for establishing sliding contact along and with the tap-off bar 2 upon application of pressure to the busbar 1, at least one fastening element 151 of the sliding contact element 15 constituting an electrically conductive connection between the electrically conductive board 16 of the connecting housing 10 and the busbar 1.

In particular, the sliding contact element 15 can also have two or more fastening elements 151, which project away from a main extension plane and/or a main extension direction of the base element 150 in a predetermined direction.

In particular, the fastening elements 151 can be designed in the form of plug connections, since it has become clear that in particular such plug connections can be plugged particularly easily into boards, in particular the above-described electrically conductive boards 16 of the connecting housing 10.

As shown in FIG. 4, the base element 150 has a mounting portion 150A and a contact portion 152 and two curved portions 153, the curved portion 153, which is directly connected to the mounting portion 150A, curving by 90° in the direction away from a main extension direction and/or main extension plane of the mounting portion 150A, the further curved portion 153, which is in direct contact with the contact portion 152, curving by less than 90° such that the contact portion 152 and the mounting portion 150A are not arranged in parallel with one another in relation to their longitudinal directions of extension and/or main directions of extension, but rather extend so as to be straight at an acute angle towards one another such that an application of pressure in the form of the above-described sliding contact is made possible as a result of this acute angle between the contact portion 152 and the mounting portion 150A.

The invention is not limited on the basis of the description and the embodiments. On the contrary, the invention comprises any novel feature and any combination of features, and this particularly also includes any combination of the claims, even if this feature or this combination of features itself is not explicitly stated in the claims or the embodiments.

LIST OF REFERENCE SIGNS

Busbar
1A-1D Electrical conductors
Tap-off bar
2A-2D Electrical tapping lines
10 Connecting housing
10A Through-opening
10B Mounting surface
13 Fastening regions
14 Plastics frame
15 Sliding contact element
16 Electrically conductive board
20 Cambi clip
20A Mounting surface
21 Upper side
22 Upper side clip elements
23 Underside
24 Underside clip elements
30 Connecting bracket
31 Opening in the connecting bracket
40 Power plug housing
40A,40B Half-shells
41 Power plug clip elements
45 End plate
65 Light signal surface
66 Screw dome
100 Contact device
150 Base element
150A Mounting portion
151 Fastening element
152 Contact portion
153 Curved portion
310 Boundary of the opening in the connecting bracket
L Longitudinal direction
CL Direction
D1 Distance

The invention claimed is:

1. Contact device for transmitting electrical energy from a preferably spatially fixed busbar to a tap-off bar, which is movable along the busbar or likewise spatially fixed, comprising:
   at least one connecting housing, the busbar being mechanically connected to the tap-off bar by means of the connecting housing, and
   at least one combi clip, the combi clip being brought into engagement with part of the outer periphery of the connecting housing in a mechanically releasable manner and establishing a mechanical connection between the connecting housing and a connecting bracket,
   wherein, by clipping the combi clip onto the part of the outer periphery of the connecting housing, the mechanical connection is established between the connecting housing and the connecting bracket, the combi clip being mechanically connected to the connecting bracket releasably or non-releasably; wherein
   the combi clip has at least one underside clip element for fastening in an opening of the connecting bracket on an underside opposite the upper side, the underside clip element being designed such that it mechanically brings itself into engagement with a boundary of the opening in the connecting bracket upon application of compressive force onto the combi clip towards the connecting bracket.

2. Contact device according to claim 1, wherein the combi clip has at least one upper side clip element on an upper side for clipping onto the connecting housing, the upper side clip element being designed such that upon application of compressive force towards the connecting housing it is automatically positioned against the outer periphery of the connecting housing and/or a free end of the upper side clip element connects to a fastening region of the connecting housing which is provided for said end and is explicitly assigned to said end.

3. Contact device according to claim 2, wherein the underside clip element interlocks with the opening in the connecting bracket.

4. Contact device according to claim 3, further comprising:
at least one power plug housing, wherein the power plug housing is positioned mechanically and from the outside on the busbar and/or on the tap-off bar such that a mechanical connection between the connecting housing and the busbar and/or the connecting bar is established by the power plug housing.

5. Contact device according to claim 4, wherein the power plug housing is at least partially open on one side, and on this side has at least one power plug clip element, the power plug clip element being designed such that, upon application of compressive force towards the connecting housing, it is automatically positioned against the outer periphery of the connecting element and/or a free end of the power plug clip element is connected to an additional fastening region of the connecting housing, which is provided for said end and is explicitly assigned to said end, at least part of the preferably spatially fixed busbar therefore being arranged between the connecting housing and an internal wall of the power plug housing.

6. Contact device according to claim 5, wherein the connecting housing comprises at least one electrically conductive sliding contact element, this sliding contact element being connected on one side to an electrically conductive board of the connecting housing and being electrically conductively connected on the other side to the busbar via a slide contact.

7. Contact device according to claim 6, wherein the sliding contact element comprises an elongate base element, which is set up and provided to establish sliding and electrically conductive sliding contact along and with the busbar upon application of pressure on the busbar, at least one fastening element of the sliding contact element establishing an electrically conductive connection between the electrically conductive board of the connecting housing and the busbar.

8. Contact device according to claim 7, wherein the base element has at least one mounting portion for electrically conductive mounting on the board, the mounting portion constituting the fastening element or the fastening element being releasably or non-releasably fastened thereto, and has a contact portion, the contact portion being electrically conductively connected to the mounting portion by means of at least one curved portion, and the curved portion extending at an angle of less than 90 degrees relative to the mounting portion.

9. Contact device according to claim 1, wherein the underside clip element interlocks with the opening in the connecting bracket.

10. Contact device according to claim 9, further comprising:
at least one power plug housing, wherein the power plug housing is positioned mechanically and from the outside on the busbar and/or on the tap-off bar such that a mechanical connection between the connecting housing and the busbar and/or the connecting bar is established by the power plug housing.

11. Contact device according to claim 10, wherein the power plug housing is at least partially open on one side, and on this side has at least one power plug clip element, the power plug clip element being designed such that, upon application of compressive force towards the connecting housing, it is automatically positioned against the outer periphery of the connecting element and/or a free end of the power plug clip element is connected to an additional fastening region of the connecting housing, which is provided for said end and is explicitly assigned to said end, at least part of the preferably spatially fixed busbar therefore being arranged between the connecting housing and an internal wall of the power plug housing.

12. Contact device according to claim 11, wherein the connecting housing comprises at least one electrically conductive sliding contact element, this sliding contact element being connected on one side to an electrically conductive board of the connecting housing and being electrically conductively connected on the other side to the busbar via a slide contact.

13. Contact device according to claim 12, wherein the sliding contact element comprises an elongate base element, which is set up and provided to establish sliding and electrically conductive sliding contact along and with the busbar upon application of pressure on the busbar, at least one fastening element of the sliding contact element establishing an electrically conductive connection between the electrically conductive board of the connecting housing and the busbar.

14. Contact device according to claim 13, wherein the base element has at least one mounting portion for electrically conductive mounting on the board, the mounting portion constituting the fastening element or the fastening element being releasably or non-releasably fastened thereto, and has a contact portion, the contact portion being electrically conductively connected to the mounting portion by means of at least one curved portion, and the curved portion extending at an angle of less than 90 degrees relative to the mounting portion.

15. Contact device according to claim 14, wherein the sliding contact element is formed integrally.

* * * * *